Aug. 27, 1957 E. COTRONEO 2,804,503

SWITCHING SELECTOR REPEATER SYSTEMS

Filed July 12, 1954 4 Sheets-Sheet 1

INVENTOR.
EDOARDO COTRONEO

BY Wm Walter Owen

ATTY.

INVENTOR.
EDOARDO COTRONEO
BY Mc Walter Owen
ATTY.

INVENTOR.
EDOARDO COTRONEO
BY Wm. Walton Owen
ATTY.

Aug. 27, 1957 E. COTRONEO 2,804,503

SWITCHING SELECTOR REPEATER SYSTEMS

Filed July 12, 1954 4 Sheets-Sheet 4

INVENTOR.
EDOARDO COTRONEO

BY McWatters Owen

ATTY.

United States Patent Office 2,804,503

Patented Aug. 27, 1957

2,804,503

SWITCHING SELECTOR REPEATER SYSTEMS

Edoardo Cotroneo, Milan, Italy, assignor to General Telephone Laboratories, Incorporated, a corporation of Delaware Application July 12, 1954, Serial No. 442,784

19 Claims. (Cl. 179—18)

The present invention relates in general to automatic telephone systems of the multi-office type, but is more particularly concerned with systems of this character in which the main offices of the system have several smaller exchanges subsidiary to them, commonly known as branch or satellite exchanges, and the object of the invention is the provision of an improved switching selector repeater in the branch office switching equipment.

Branch exchange trunking is customarily arranged so that a branch exchange subscriber, upon initiating a call, is connected with the branch exchange selector repeater and is also connected over an outgoing branch to main exchange trunk to an incoming selector in the main exchange. The selector repeater and the incoming selector operate in synchronism in response to the dialled impulses, and when sufficient digits have been dialled to determine the destination of the call, either the selector repeater is disabled for further operation on calls including the main exchange, or the trunk connection to the main exchange is released on calls which can be completed directly from the selector repeater to the branch exchange. The switching operation is controlled by the selector repeater in the branch exchange according to the number called.

In a system as above described, it often happens that two or more of the branch exchanges are located fairly close together while being fairly distant from the main exchange and that there is heavy traffic between these two adjacent branch exchanges. Under these conditions, and in order to economize on trunk lines, the two branch exchanges are interconnected directly by trunk lines and calls between these two branch exchanges are normally completed over these direct branch exchange trunks through the wipers and bank contacts of the selector repeaters, and the trunk connection from the calling branch exchange to the main exchange is released. In a system of this type all of the branch exchange trunks directly interconnecting the two branch exchanges accessible to the selector repeater may be busy at a time when a calling subscriber in one branch exchange calls a subscriber in the other branch exchange and such calling subscriber would ordinarily receive the busy tone from the selector repeater. Another object of the invention is the provision of means in the switching selector repeater whereby, in the event the selector repeater in the calling branch exchange is unable to connect with an idle trunk directly interconnecting the calling and called branch exchanges, the trunk connection to the main exchange is maintained, instead of being released, and the call is completed over automatic switches in the main exchange and over trunks from the main exchange to the called branch exchange.

The foregoing features together with others not specifically mentioned will be described in more detail together with the operation of the equipment, reference being had to the accompanying drawings forming part of this specification.

Referring now to the drawings, Fig. 1 shows the relative location of a main exchange M and two branch, or satellite, exchanges; and Fig. 2 shows the general trunk arrangement interconnecting the main and branch exchanges of Fig. 1. Figs. 3, 4 and 5 show the detail circuits of the switching selector repeater SR and the rotary line switch MX terminating the trunks extending to the main exchange.

Referring now to Fig. 2, the reference letter S1 designates one of the branch exchanges, letter A designates a branch exchange subscriber having an individual line circuit LC of a well-known type, F designates a finder which has access to calling branch exchange subscriber lines by way of their line circuits, SR designates a switching selector repeater having an individual rotary line switch which has access to trunks to the main exchange M. The selector repeater has access to local third selectors, such as 3rd Sel., and these third selectors have access to connector switches, such as C. The banks of the local third selectors, as shown, are multipled to the banks of incoming third selectors, such as Inc. Sel. The selector repeater also has access to trunks extending to an adjacent branch exchange S2 and terminating in incoming third selectors, such as Inc. Sel. in branch exchange S2. The branch to main exchange trunks, such as 371—373, extend from the banks of the branch exchange rotary line switch MX and terminate in incoming first selectors Inc. Sel. in the main exchange M. The incoming selectors in the main exchange have access to second selectors in the usual manner, one of which is shown having access to incoming third selectors Inc. Sel. in both branch exchanges S1 ad S2. The incoming selectors in exchange S2 have access to connector switches, such as C, and the connector switches have access to subscriber lines, such as B. The second branch exchange S2 may also be equipped with selector repeaters in the same manner as shown in branch exchange S1. Only sufficient trunking has been shown to enable the invention to be described, it being understood that only part of the trunking is being shown and that connections through the main exchange may be completed in the usual well-known manner.

The finder switches, such as F, are the usual Strowger type switches having vertical and rotary movement to find the calling subscriber lines and are individually connected to switching selector repeaters, such as SR. The selector repeaters SR are also the usual Strowger type switches having vertical and rotary movement and have access by way of their wipers to local third selectors and to incoming selectors Inc. Sel. in adjacent branch exchanges, one of which is shown. A rotary lineswitch of the well-known type, such as MX, is individually connected to each switching selector repeater and has access to branch to main exchange trunks, which terminate in incoming first selectors in the main exchange M. These first selectors, in the usual manner, have access to second selectors and these second selectors have access to third selectors. All third selectors in the respective exchanges have access to connector switches and these connector switches have access to subscriber lines. The selector and connectors are the usual Strowger type switch having vertical and rotary movement to extend the connection.

The system shown illustrates a five digit system in which one thousand group of numbers is assigned for branch exchange lines and to certain groups of subscriber lines which are reached through the main exchange switching equipment. The numbers of the 89000 series are assigned to the first branch exchange S1 and the numbers of the 88000 series are assigned to the second branch exchange S2. The numbers of the 81000, 82000, 83000, and 87000 series may be assigned to any one of the branch exchanges and the numbers of the 84000 series may be assigned to subscriber lines which are reached through the main exchange. Any number which constitutes a first digit, other than digit 8, designates a call which will be completed by way of the main exchange M.

Figs. 3, 4 and 5 show the detail circuits of the switching selector repeater SR having two sets of wipers 341—343 and 344—346 which are first operated vertically and then rotated to extend the connection if the call is to be completed over such wipers. The selector repeater has a vertical wiper VW which has access to a set of vertical banks VB for controlling the operations of the selector repeater after a vertical movement. Vertical off-normal contacts VON217, VON239, VON245 and VON353 are shown in their normal positions and are operated as soon as the switch shaft and wipers are moved off-normal. Normal post springs NPS145 and NPS352 are operated only when the switch shaft has been raised to its tenth level. The selector repeater SR also has cam springs CAM205, CAM219, and CAM351 which are operated when the wipers of the selector repeater are rotated to their eleventh position bank contacts, one of which is shown and designated 389. The rotary line switch MX has four wipers which are rotated by the motor magnet MM. Having given a general description of the apparatus and equipment, a detail description of the operation will now be given.

*Detailed description*

Figures 1, 2:
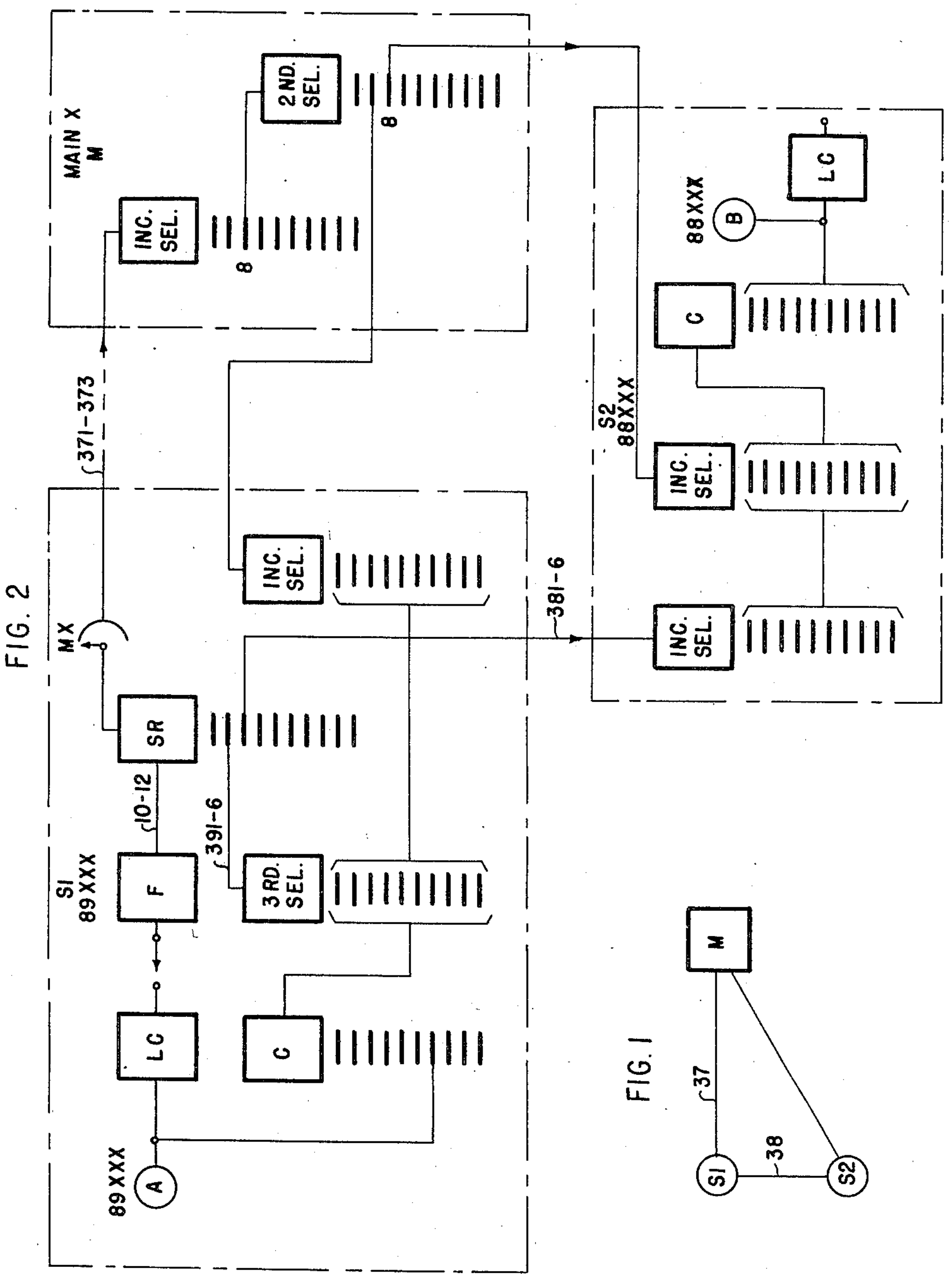
Figure 3:
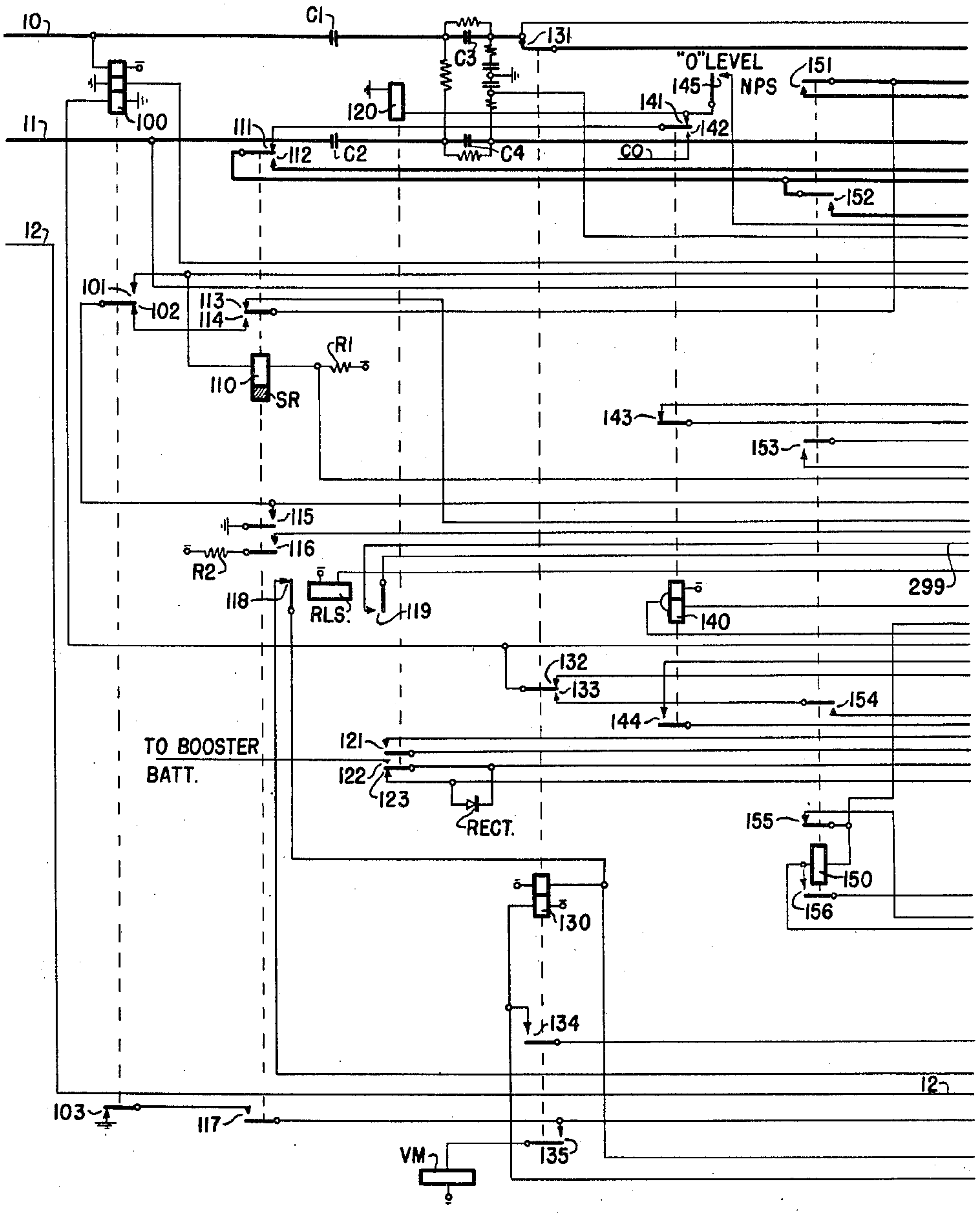
Figure 4:
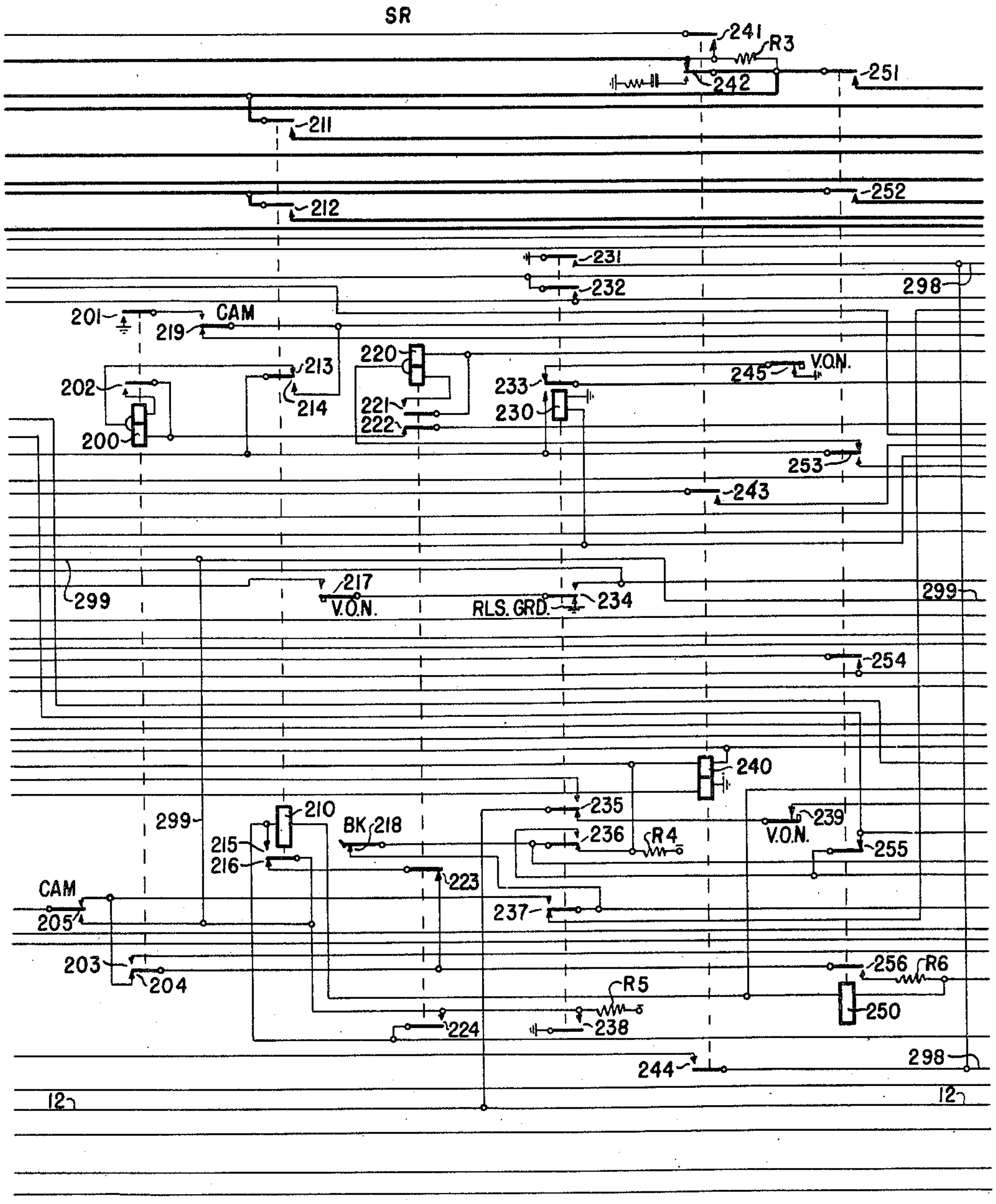
Figure 5:
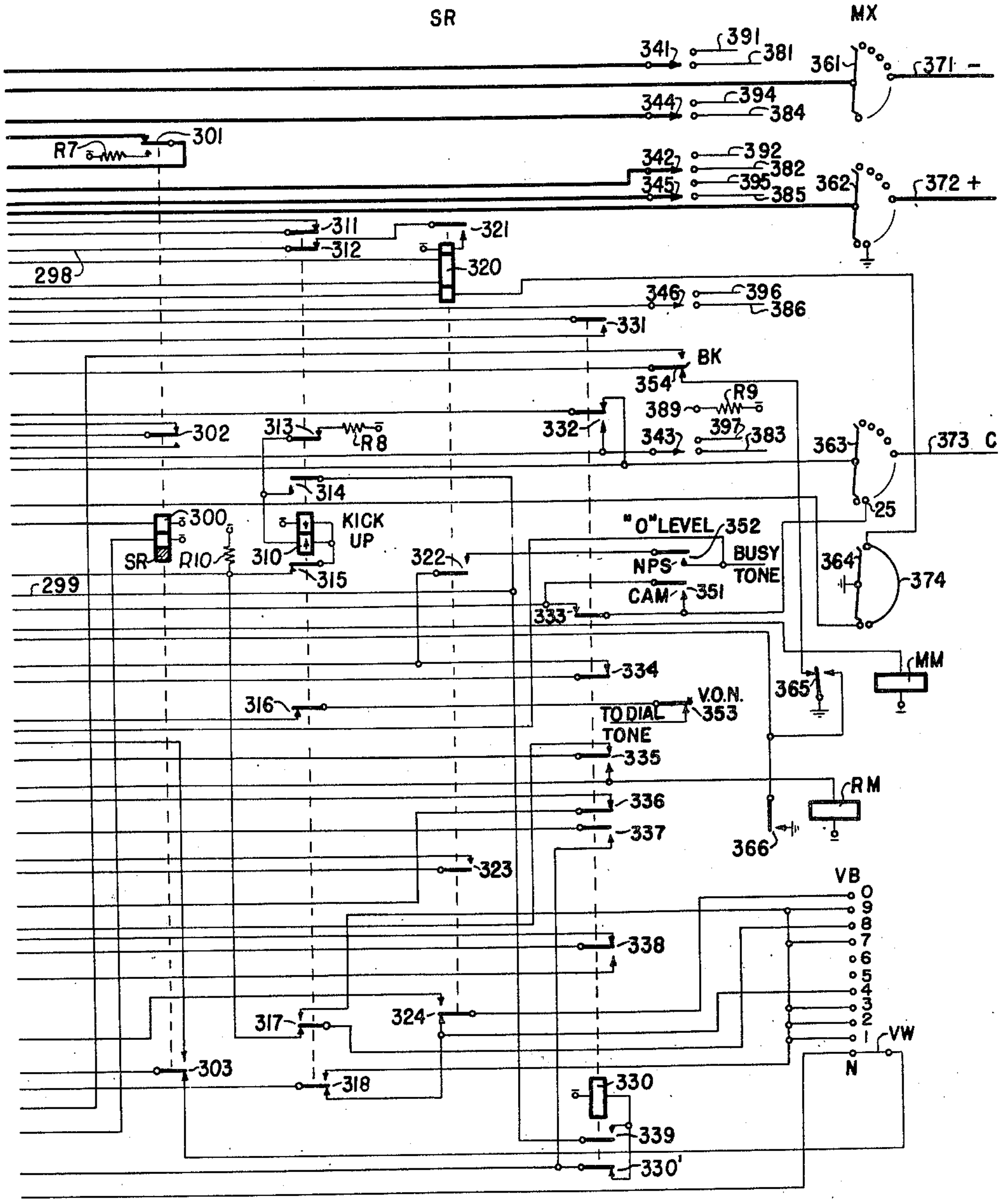

It will now be assumed that a calling subscriber A in the first branch exchange S1 desires to call a subscriber B in the second branch exchange S2. In response to the calling subscriber A removing his receiver, the line circuit LC and the finder F operate in a well-known manner to connect the switching selector repeater SR to the calling line to complete a circuit for energizing relay 100. This circuit may be traced as follows: from ground through the center winding of relay 100, center winding of relay 320, positive conductor 11 through the finder F and line circuit LC, through the switch hook and dial of subscriber A, back over the negative line conductor through the line circuit LC and finder F to conductor 10 and through the upper winding of relay 100 to battery. Relay 320 is marginal and will not operate in this circuit unless a restricted subscriber originated the call. Relay 100 at make contacts 101 completes a circuit for operating relay 110 as follows: from grounded wiper 364 of the rotary lineswitch MX in engagement with its normal bank contact, through contacts 101, winding of slow to release relay 110, and through the resistance R1 to battery.

Relay 110, upon operating, at contacts 111 opens the circuit to relay 120 and at contacts 112 prepares a point in the talking circuit. At contacts 113, relay 110 opens a point in the circuit to the upper winding of the slow to release series relay 300; at contacts 114, prepares a point in the pulsing circuit for repeating the dial pulses to subsequent switches; at contacts 115, places another ground on the pulse repeating circuit; at contacts 116, completes the circuit for energizing relay 230; and at contacts 117, prepares a circuit for operating the vertical magnet VM and relay 300. The circuit for energizing relay 230 extends from ground through the winding of relay 230 through contacts 116 of relay 110 and resistance R2 to battery. Relay 230, at contacts 231, completes a circuit for energizing relay 130 as follows: ground, contacts 231, back contacts 303, vertical wiper VW, and through the lower winding of relay 130 to battery. Contacts 231 also ground conductor 298. At contacts 232, relay 230 short circuits the center winding of relay 320 to improve the impulsing circuit to relay 100 and to prevent a subsequent operation of relay 320; at make contacts 233, prepares a point in the test circuit for test relay 200; at contacts 234, prepares a point in the circuit for the release magnet RLS; at contacts 235, connects ground through the lower winding of relay 240 to the incoming C lead 12 to mark the selector repeater busy; and at contacts 236, removes battery through the resistance R4 from the C lead 12 and shunts contacts 323 of relay 320. At contacts 237, relay 230 prepares a point in the circuit for the motor magnet MM and opens the circuit extending to the lower winding of relay 320; and at contacts 238, grounds the release conductor 299 to complete the energizing circuit for motor magnet MM.

Relay 130 is energized and at contacts 133, prepares a point in the circuit for connecting dial tone in the calling line; at contacts 134, prepares its own locking circuit; and at contacts 135, prepares the circuit for operating vertical magnet VM. The circuit for energizing motor magnet MM may be traced as follows: from ground through contacts 238, back contacts 216, contacts 223, back contacts 204, make contacts 237, busy key contacts 218, make contacts 236, contacts 255, 143, 335, 155 and through the winding of motor magnet MM to battery. At make contacts 365, motor magnet MM completes a circuit through the upper winding of relay 140, to energize the latter relay. Relay 140 at contacts 143, opens the previously traced circuit for operating the motor magnet MM whereupon magnet MM restores. The wipers 361 to 364 inclusive, now engage their first bank contacts. When magnet MM restores, the previously traced circuit for operating relay 140 is opened, and at back contacts 365, a circuit is completed for the test relay 200 in the event the wipers are standing on an idle main exchange trunk. In case this first main exchange trunk is busy, test wiper 363 will engage a grounded bank contact with the result that test relay 200 is short circuited and will not operate. When relay 140 restores, contacts 143 again reclose the circuit to the motor magnet MM, and the motor magnet at contacts 365 again reoperates interrupter relay 140 which again opens the circuit to the motor magnet. This interaction between the motor magnet MM and the interrupter relay 140 continues until an idle main exchange trunk is encountered.

Assuming that the first idle main exchange trunk is the trunk comprising conductors 371 to 372, then the test conductor 373 is connected to negative battery potential in the incoming selector in the main exchange to complete the operating circuit for the test relay 200. The circuit for operating test relay 200 may be traced as follows: from ground, through back contacts 365 of motor magnet MM, back contacts 354 of the busy key BK, make contacts 233, back contacts 213, through the lower winding of relay 200, contacts 222 and 332, wiper 363, bank contact terminating conductor 373 and through the winding of a relay in the incoming main exchange selector to battery. Relay 200, at contacts 202, connects its second winding in parallel with its first winding to increase the ground potential on the bank contact engaged by wiper 363, thereby reducing the possibility of double connections; and at contacts 204, opens the circuit to the motor magnet MM. At contacts 203, test relay 200 completes a circuit for energizing the main exchange switching relay 150 in series with the motor magnet MM as follows: from ground, through contacts 238, back contacts 216, contacts 223, contacts 203, back contacts 338, through the winding of relay 150 and through the winding of motor magnet MM to battery. Relay 150 is energized over this circuit, but the motor magnet MM, being marginal, does not operate in series with the high resistance winding of relay 150.

Relay 150, at contacts 151, prepares a point in the pulse repeating circuit over the negative line conductor 371; at contacts 152, prepares a point for connecting battery through resistance R7 and contacts 301 to the positive line conductor 372 during dialling; and at contacts 153, grounds conductor 373 over the following circuit: ground, through back contacts 365, back contacts 354 of the busy key BK, make contacts 233, contacts 153, wiper 363, conductor 373, through a relay in the incoming selector of the main exchange, thereby conditioning said incoming selector to receive incoming pulses in a well-known manner. At contacts 153, relay 150 short circuits the test relay 200 over the following circuit: from contacts 153, through back contact 332, contact 222, both windings of relay 200, back contact 213, and back to contact 153. At contacts 154, relay 150 connects dial tone by way of vertical off-normal contacts 353, contacts 316, 154 and 133 to the lower winding of relay 100 whereupon dial tone is induced through the other windings of the line relay 100 and connected to the incoming conductors 10 and 11 to transmit dial tone to the calling subscriber. At contacts 156, relay 150 prepares a locking circuit for relay 150 that is effective when relay 200 deenergizes and closes contacts 204; and at contacts 155, relay 150 opens the circuit for operating motor magnet MM.

Relay 200 deenergizes shortly after its circuit is shorted and at contacts 204 closes a locking circuit for relay 150 as follows: from ground through contacts 238, 216, 223, 204, 205, 156, winding of relay 150 and through the winding of motor magnet MM to battery. In response to the seizure of the selector repeater SR, the outgoing rotary line-switch MX has been operated to seize a trunk extending to the main exchange, and in response to this connection the calling subscriber receives dial tone to inform him that he may now dial the called subscriber's number.

In response to dialling the first digit 8 of the called branch exchange subscriber's number, the line relay 100 is released and reoperated eight times to transmit eight impulses over the negative main exchange trunk lead 371, and to transmit eight pulses to the vertical magnet VM and relay 300. At contacts 101, line relay 100 on each deenergization momentarily opens the circuit to the slow release relay 110, but this relay due to its slow release characteristics is maintained energized during the dialling period. At contacts 102, each deenergization of line relay 100 transmits a pulse to the line relay in the incoming selector in the main exchange over the following circuit: ground, through contacts 115, 102, 114 and 151, wiper 361, negative main exchange trunk conductor 371, and through the line relay (not shown) in the incoming main exchange selector to battery. At contacts 103, relay 100 transmits eight impulses over contacts 117 and 135 to vertical magnet VM, and also transmits eight impulses to the slow to release series relay 300. The vertical magnet VM operates to raise the wipers 341 to 346 inclusive, and vertical wiper VW of the selector repeater, one vertical step for each impulse received, thereby positioning these wipers opposite the eighth level of bank contacts and causing the vertical wiper VW to engage its eighth vertical bank contact. In response to the first vertical step of the switch shaft and wipers, the vertical off-normal springs VON217 prepare a point in the circuit to the release magnet RLS, and vertical off-normal contacts 353 open the circuit for transmitting dial tone to the calling subscriber.

Slow to release series relay 300 is operated during the dialling period and, at contacts 301, connects battery through resistance R7 over contacts 112 and 152 to wiper 362 and the positive conductor 372 extending to the main exchange to control the main exchange incoming selector in its customary operations. At contacts 302, relay 300 prepares an auxiliary holding circuit for relay 230. At back contacts 303, relay 300 disconnects ground from the vertical wiper VW to momentarily open the circuit to relay 130; and at make contacts 303, completes a circuit for operating relay 240 as follows: from ground through contacts 231, make contacts 303, upper winding of relay 240 and through resistance R4 to battery. At contacts 243, relay 240 completes an auxiliary circuit including contacts 302 and resistance R1 to maintain relay 230 operated; and at contacts 244, completes a locking circuit for relay 130 before the latter relay deenergizes when its circuit is momentarily opened by the operation of relay 300. The locking circuit for relay 130 extends from ground through contacts 231, contacts 244 and 134 and the lower winding of relay 130.

Shortly after the wipers of the selector repeater have been raised to their eighth level, and the incoming selector in the main exchange has likewise been operated to its eighth level, the slow to release series relay 300 restores to remove negative battery potential from the positive line conductor 372 at contacts 301; at contacts 302, momentarily short circuits relay 110 and opens the previously traced auxiliary circuit for relay 230; and at contacts 303, opens the circuit to relay 240 which restores to normal. At contacts 303, a circuit is completed for energizing both windings of the differential 'kick up" relay 310 as follows: from ground through contacts 231, back contacts 303, vertical wiper VW in engagement with its eighth vertical bank contact, break contact 317, contact 315 through the upper winding of relay 310 to negative battery, and through the lower winding of relay 310, contacts 313 and resistance R8 to negative battery. Both windings of differential relay 310 will be energized in opposition and since relay 310 is a differential relay, it is not operated at this time. A branch of the above traced circuit extends from the back contact 317 of relay 310 and over make contacts 234, vertical off-normal springs 217 and through the winding of release magnet RLS to battery.

Relay 240 restores when its circuit is opened by relay 300 at contacts 303; at contacts 243, relay 240 removes the momentary short circuit from around relay 110; and at contacts 244, relay 240 opens the locking circuit of relay 130 to cause the latter relay to restore. At contacts 135, relay 130 opens a point in the circuit to the vertical magnet VM.

The operation of the release magnet RLS, in the well known manner, causes the wipers of the selector repeater to be restored to their normal position. At contacts 119, release magnet RLS completes a locking circuit for itself until the vertical off-normal springs 217 open when the wipers are fully restored. At contacts 118, release magnet RLS opens the circuits extending to relays 130 and 330 to prevent their operation during the release of the selector repeater to normal. When the wipers of the selector repeater are fully restored, the vertical off-normal springs 217 open the locking circuit of the release magnet RLS to cause the magnet to restore. During the time that the contacts 119 of the release magnet are closed, a circuit through the differential relay 310 is maintained from ground through contacts 238, 119 and 315, until the release magnet restores and opens contacts 119 to thereby open the energizing circuit to the two windings of relay 310. When this circuit is opened an inductive kick is generated in the windings of relay 310 to cause it to close its preliminary make contacts 314, at which time ground from ground conductor 299 is connected through the lower and upper windings of relay 310 in series and in an aiding direction to cause the relay to fully operate its remaining contacts.

The contacts associated with relay 310 operate as follows: contacts 312 open the locking circuit of relay 320 which restores if operated; contacts 313 disconnect battery and resistance R8 from the windings of relay 310, contacts 315 open a point in the original energizing circuit for differentially energizing relay 310, contacts 316 open the circuit for transmitting dial tone to the calling subscriber, contacts 317 and 318 prepare circuits for relays 130 and 330, back contacts 317 open the original circuit for differentially energizing relay 310 and prepare a new circuit from the eighth level vertical bank contact, back contact 318 disconnects the fourth level vertical bank contact from the relays 130, and 330 and make contacts 318 prepare new circuits from the vertical bank contacts 1, 2, 3, 7, 8 and 9.

When the vertical wiper reaches normal, the circuit to relay 130 is again completed, and contacts 135 again prepare the circuit to the vertical magnet VM. From the foregoing it will be seen that in response to the calling subscribed dialling the first digit 8 of the called number, the incoming selector in the main exchange has been operated to its eighth level and in its customary manner rotates to find an idle second selector switch in the main exchange; that the selector repeater has been operated to its eighth level at which position the wipers of the selector repeater are caused to restore to normal; and that the "kick up" relay 310 has been operated and locked to change the markings extending from the vertical bank of the selector repeater.

The selector repeater is now in condition to respond to the second dialled digit. In response to dialling the second digit 8, the line relay 100 is again deenergized eight times to cause contacts 102 to transmit impulses over the main exchange trunk to operate the seized second selector in the main exchange in a well-known manner. At contacts 103, relay 100 reoperates the vertical magnet and relay 300 as previously described. Relay 300 again connects negative battery over the main exchange trunk lead 372 to control the main exchange second selector, and again operates relay 240 at contacts 303. Relay 240 again completes the locking circuit for relay 130. The wipers of the selector repeater are operated again to their eighth level and shortly thereafter relay 300 restores to disconnect battery from the main exchange conductor 372 to thereby cause the seized main exchange second selector to hunt for an idle trunk in the main exchange which extends to branch exchange S2. At contacts 303, relay 300 grounds the eighth vertical bank through the vertical wiper VW to complete the following circuit: from ground through contacts 231, back contacts 303, vertical wiper VW, eighth vertical bank contact, make contacts 317, make contacts 318, contacts 118, and over one path through the upper winding of relay 130 to battery and over another path through contacts 330' and the winding of relay 330 to battery. Relay 240 restores when relay 300 restores and contact 244 opens the locking circuit through the lower winding of relay 130. The relay 130 does not at this time restore because of the circuit previously traced through its upper winding.

Relay 330 energizes over the above traced circuit, and the associated contacts cause the following operations: contacts 331 prepare a test circuit to test relay 220 and test wiper 346, contacts 332 prepare a test circuit to test relay 200 and test wiper 343, contacts 335 complete a circuit for energizing the rotary magnet RM of the selector repeater, contacts 337 complete a circuit for holding relay 130 operated, contacts 338 prepare a circuit for wiper switching relay 250, contacts 339 complete a lock circuit for relay 330 over grounded conductor 299, and contacts 330' open a point in the original energizing circuit of relay 330. The circuit for holding relay 130 operated may be traced as follows: from ground through contacts 238, 216, 223, 204, 237, 218, 236, 255, 337 and through the upper winding of relay 130 to battery. The circuit for operating the rotary magnet RM of the switching selector repeater may be traced as follows: from ground through contacts 238, 216, 223, 204, 237, 218, 236, 255, 143, 335 and through the winding of rotary magnet RM to battery. The rotary magnet RM energizes over the above traced circuit to rotate the selector repeater wipers 341 to 346 inclusive. The wipers rotate one step into engagement with the first set of bank contacts in the eighth level terminating the first trunks interconnecting the two bank exchanges S1 and S2. At contacts 366, the rotary magnet RM completes a circuit for energizing the upper winding of interrupter relay 140. Interrupter relay 140, at contacts 143, opens the circuit to the rotary magnet RM and the rotary magnet restores. When the rotary magnet restores it opens contacts 366 to restore relay 140.

The operation of the selector repeater now depends upon whether either test wiper 343 or 346 encounters an idle branch exchange trunk in the eighth level, in which case idle battery potential is connected to the called branch exchange test conductors such as conductors 383 and 386. It will be assumed that both sets of selector repeater wipers now engage their first set of bank contacts terminating conductors 381 to 386 inclusive which extend from the calling branch exchange to the called branch exchange, and that both test wipers 343 and 346 have found idle negative battery potential on conductors 383 and 386. Under these conditions both test relays 200 and 220 start to operate and relay 220, at contacts 222, opens the test circuit of relay 200 to release relay 200 in case it operates. The circuit for operating test relay 220 may be traced as follows: from ground through back contacts 365 and 354, make contacts 233, back contacts 253, upper winding of test relay 220, contacts 331, back contacts 219, test wiper 346, and over the engaged bank contact and test conductor, such as conductor 386, through the winding of a control relay in the incoming selector in the branch exchange S2 to battery. At contacts 221, test relay 220 connects its low resistance winding in multiple with its upper winding to momentarily busy the trunk by increasing ground potential on the test conductor and to insure the operation of the control relay in the incoming selector at the branch exchange. At contacts 222, test 220 opens the energizing circuit to test relay 200 to prevent its operation or to restore this relay in case the other branch exchange trunk is likewise idle. At contacts 223, test relay 220 opens the circuit to the rotary magnet RM to prevent its reoperation when relay 140 restores. Contacts 223 also open the locking circuit of the rotary lineswitch switching relay 150 which now restores as a result of the selector repeater finding an idle trunk. Contacts 223 also open the circuit extending through the upper winding of relay 130 to cause this latter relay to restore. At contacts 224, relay 220 completes a circuit for operating the wiper switching relay 210 in series with the rotary magnet RM as follows: from ground through contacts 238 and contacts 224, winding of wiper switching relay 210 and through the winding of rotary maget RM to battery. Due to the high resistance winding of relay 210 the rotary magnet is not operated in this circuit.

Relay 210 operates over the above traced circuit, and the associated contacts operate as follows: contacts 215 complete a locking circuit for relay 210 from contacts 238, contacts 211 and 212 connect up the negative and positive line wipers 344 and 345, and contacts 213 open the circuit to test relay 200 to prevent its operation. At contacts 214, relay 210 connects direct ground to wiper 346 and the branch exchange test lead, such as 386, to mark this trunk busy and to further condition the incoming selector in the branch exchange for operation. Contacts 214 also close the following short circuit around test relay 220 to cause the relay to restore; from contacts 214, 253, both windings of relay 220, contacts 331 and 219 back to contacts 214. At contacts 216, relay 210 opens a further point in the locking circuit of relay 150 and also opens a further point in the circuit of relay 130 to prevent its reoperation.

Relay 150 restores when its locking circuit is opened, contacts 151 and 152 open the circuit to the main exchange trunk conductors 371 and 372, and contacts 153 disconnect ground from conductor 373 to remove the busy condition and to release the main exchange trunk and the incoming selectors which were previously operated in the main exchange. Relay 130 restores when its circuit is opened at contacts 223, and contacts 135 open a point in the circuit to the vertical magnet VM. Test relay 220 restores shortly after its above traced short circuit is completed.

In case the branch exchange trunk comprising conductors 384 to 386 is busy, test conductor 386 is grounded and relay 220 fails to operate due to it being shorted; and if the branch exchange trunk comprising conductors 381 to 383 is idle, then battery potential on conductor 383 operates test relay 200. This circuit may be traced as follows: from ground through back contacts 365 and 354, contacts 233 and 213, lower winding of test relay 200, contacts 222 and 332, test wiper 343 and test conductor, such as test conductor 383, and through the winding of a control relay in the incoming selector at branch exchange S2 to battery. Test relay 200, at contacts 202, connects ground through the low resistance upper winding of relay 200 to further insure the operation of the control relay in the incoming selector in the branch exchange as well as to assist in the prevention of double connections. At contacts 204, test relay 200 opens a circuit to the rotary magnet RM to prevent its reoperation when relay 140 restores, opens the locking circuit of relay 150 which now restores, and also opens the circuit to the upper winding of relay 130 which likewise restores. At contacts 203, relay 200 completes a circuit for operating the wiper switching relay 250 in series with rotary magnet RM as follows: from ground through contacts 238, back contacts 216, 223, 203, 338, winding of relay 250 and winding of rotary magnet RM to battery. The rotary magnet RM is marginal in this circuit and will not operate in series with the high resistance winding of relay 250. Switching relay 250, at contacts 251, 252 and 253, connects up the selector repeater wipers 341 to 343. At contacts 253, relay 250 grounds the test lead, such as conductor 383, over the following circuit: from ground through back contacts 365 and 354, and make contacts 233 and 253. Make contacts 253 complete a short circuit for test relay 200 from contacts 253, through make contacts 332, contacts 222 and 202, both windings of relay 200, break contacts 213 to contacts 253. This short circuit around the test relay 200 causes the relay to restore shortly thereafter. At break contacts 253, relay 250 also opens the circuit to test relay 220 to prevent its operation in case the trunk accessible to wipers 344—346 becomes idle. At contacts 254, relay 250 prepares a circuit for the lower winding of line relay 100; at contacts 255, opens the circuit to the rotary magnet RM to prevent its reoperation, and at contacts 256, completes its own locking circuit. This locking circuit may be traced as follows: from ground through contacts 238, back contacts 216, contacts 223 and 256, through the resistance R6 and the winding of relay 250, and the winding of rotary magnet RM to battery. Relay 150 restores when its circuit is opened at contacts 204 to release the main exchange trunk in the same manner as previously described. Relay 130 restores when its circuit is opened at contacts 204 to open the circuit to the vertical magnet VM at contacts 135.

In case both branch exchange trunks engaged by the selector repeater wipers are busy then the test relays 220 and 200 do not operate and in this case the circuit for reoperating rotary magnet RM is again closed when relay 140 closes contacts 143 as follows: ground through contacts 238, 216, 223, 204, 237, 218, 236, 255, 143 and 335 and the winding of rotary magnet RM to battery. Rotary magnet RM steps the wipers of the selector repeater another step and closes contacts 366 to reoperate relay 140 over its upper winding. Relay 140 again, at contacts 143, interrupts the circuit of the rotary magnet RM to cause the rotary magnet to restore and open the circuit of relay 140 at contacts 366. This interaction between the rotary magnet RM and relay 140 continues until either test relay 220 or relay 200 operate and the associated wiper switching relay 210 or 250 operate as previously described to connect with an incoming third selector in the called branch exchange.

Subsequent digits dialled by the calling subscriber reoperate line relay, 100 and the line relay at contacts 102, repeats pulses over the negative leads such as 381 or 382 of the seized branch exchange trunk to operate the incoming third selector in the called branch exchange S2 in the well-known manner to extend the call to the called branch exchange subscriber's line. The relay 300, in the same manner as previously described, maintains negative battery potential over the positive lead such as leads 382 or 385 during dialling, by the operation of contacts 301 to control the switches in the branch exchange in the well-known manner.

Let us assume now that all of the branch exchange trunks accessible to the selector repeater wipers 341 to 346 inclusive are busy, in which case neither test relay 220 or test relay 200, or the wiper switching relays 210 or 250 are operated because no idle trunks were found. In this case the selector repeater wipers step to their eleventh bank contact and close the cam springs 205, 219, and 351. Cam springs 205 complete a new locking circuit for relay 150 as follows: from ground through contacts 238, make contacts of cam springs 205, contacts 156, winding of relay 150 and through the winding of motor magnet MM to battery. Cam spring 219 opens a point in the circuit to test relay 220 and prepares a circuit for operating the peg count meter (not shown) connected to the eleventh bank contact engaged by wiper 346. When test wiper 343 engages its eleventh bank contact 389, relay 200 is operated over the following circuit: ground by way of contacts 365, 354, 233, 213, lower winding of relay 200, contacts 222 and 332, wiper 343, eleventh bank contact 389 and through the resistance R9 to battery. At contacts 201, test relay 200 completes a circuit to operate the peg count meter (not shown) over wiper 346 and engaged eleventh bank contact. At contacts 203, relay 200 operates the wiper switching relay 250 over the previously traced circuit. At contacts 204, relay 200 again opens the circuits of relay 130 and rotary magnet RM. Contacts 204 also open the first locking circuit of relay 150 but the relay 150 is held over its new locking circuit completed by cam springs 205. Relay 130 deenergizes and contacts 135 open the circuit to the vertical magnet as previously described. In this case it will be seen that the main exchange switching relay 150 is maintained energized over cam springs 205 with the result that the connection over the main exchange trunk, over conductors such as conductors 371 to 373 inclusive, is now held instead of being released.

It will be remembered that the digits 8 and 8 dialled by the calling subscriber were repeated by line relay 100 over the main exchange trunk to the switches in the main exchange, and that the main exchange switches were operated by these digits to seize an idle trunk extending from the main exchange to the called branch exchange S2 where the seized trunk terminates in an incoming third selector. Subsequent digits dialled by the calling subscriber are repeated by the line relay 100 to operate the incoming third selector and connector in the called branch exchange by way of the main exchange to complete the desired connection. From the foregoing description it will be seen that calls between the two branch exchanges are normally completed over the wipers of the selector repeater and direct trunks interconnecting the two branch exchanges as long as one or more of these direct branch exchange trunks are idle; and that the trunk connection to the main exchange and the operated switches in the main exchange are released as soon as the selector repeater seizes an idle branch exchange trunk. However, in case the selector repeater fails to find a direct branch exchange trunk to the called branch exchange, because all such trunks are busy, then the connection from the calling branch exchange over the trunk to the main exchange and the operated switches in the main exchange are maintained, instead of being released, and the connection to the called branch exchange subscriber is completed, through the main exchange over the operated switches therein and over a trunk interconnecting the main exchange with the called branch exchange and automatic switches in the called branch exchange, to the called subscriber's line.

It will now be assumed that the calling subscriber A in the branch exchange S1 calls another subscriber in his local branch exchange. On initiation of a call, the selector repeater is seized and relays 100, 110, 230, 130, 200, 150 and motor magnet MM are operated in the same manner as previously described to condition the selector repeater for operation and to cause the rotary lineswitch MX to seize an idle trunk to the main exchange. In response to dialling the first digit 8, the incoming first selector in the main exchange and the wipers of the selector repeater are both operated to their eighth levels as previously described. It will be remembered that the wipers of the selector repeater are restored to normal after the first digit 8 when relay 300 restores, and the "kick up" relay 310 is operated and locked to alter certain connections to the vertical bank. In response to dialling the second digit 9, the line relay 100 is pulsed nine times to repeat nine pulses over the main exchange trunk to operate the main exchange second selector to its ninth level, and to reoperate the wipers of the selector repeater to its ninth level in the same manner as previously described. Relays 300 and 240 restore shortly after dialling the second digit 9 and, since the relay 310 at make contacts 317 has connected the ninth vertical bank contact with the eighth vertical bank contact, the operation of the selector repeater is the same as that described for dialling the second digit 8, except that the selector repeater has been operated to the ninth level which terminates the local trunks connected to local third selectors in the local branch exchange. If an idle local third selector trunk is seized by the selector repeater, the main exchange trunk is released and the remaining digits dialled by the calling subscriber operate the local third selector and connector to complete the call to the called local exchange subscriber in a manner apparent from the foregoing description. It is also possible that, if all the local third selectors accessible to the selector repeater are busy, then the main exchange trunk and the automatic switches in the main exchange are held, instead of being released, and the connection may be completed back through another main to branch exchange trunk to incoming third selectors in a branch exchange in a manner similar to that previously described.

It will be noted that after relay 310 is operated and locked in response to dialling the first digit 8, that due to the closure of make contacts 317 and 318, the vertical bank contacts for the first, second, third, seventh, eighth and ninth levels are multiplied together so that the operation of the selector repeater is similar to that previously described for second dialled digits 1, 2, 3 and 7. Therefore the first, second, third and seventh levels of the selector repeater may have access to either local trunks in the same local branch exchange or to trunks interconnecting additional adjacent branch exchanges.

On calls extending through the main exchange, the relays 100, 110, 230, 130, 150 and motor magnet MM are operated in response to the seizure of the selector repeater. In response to dialling a first digit 1, the vertical magnet steps the wipers of the selector repeater to its first level and at the same time operates the first selector in the main exchange to its first level. Relays 300 and 240 restore shortly after dialling the first digit 1 and in this case no circuit is completed for 'kick up" relay 310, to the release magnet RLS, or to relay 330, with the result that the wipers of the selector repeater are held operated opposite the first level where they remain for the duration of the call. The call is now completed through the main exchange in a well known manner. This same operation occurs in case the first digit is 2, 3, 5, 6, 7 or 9.

In case the first dialled digit after seizure of the selector repeater is the digit 4, the operations are the same as previously described except that relay 130 is held operated over its upper winding, relay 330 is operated and locked, and relay 310 is not operated. The circuit for holding relay 130 operated and for operating relay 330 extends from ground through contacts 231, contacts 303 when relay 300 restores, vertical wiper VW in engagement with its fourth level vertical bank contact, back contacts 318 and 118, upper winding of relay 130 to battery, and over contacts 330' to relay 330 and battery. Relay 330 completes its own locking circuit at contacts 339; at contacts 337, holds relay 130 operated; at contacts 335, completes the circuit for the rotary magnet RM; at contacts 331, prepares the test circuit for relay 220, and at contacts 332, prepares the test circuit for relay 200. The circuit for holding relay 130 operated may be traced as follows: from ground through contacts 238, 216, 223, 204, 237, 218, 236, 255 and 337, and through the upper winding of relay 130 to battery. The circuit for operating rotary magnet RM may be traced as follows: from ground through contacts 238, 216, 223, 204, 237, 218, 236, 255, 143 and 335, and through the winding of rotary magnet RM to battery. The rotary magnet steps the wiper of the selector repeater into engagement with their first set of bank contacts and at contacts 266, operates relay 140 over its upper winding. Relay 140, at contacts 143, opens the circuit to the rotary magnet RM which thereupon restores. The test circuits to relays 220 and 200 are completed and these relays are operated in the same manner as previously described to control the wiper switching relays 250 and 210 to extend the connection to a local second selector or to a different branch exchange dependent upon the trunking arrangement.

In case the first dialled digit is the digit 0, the wipers of the selector repeater are raised to the tenth level and the normal post springs NPS145 and NPS352 are closed. Normal post springs NPS145 prepare a point in the circuit for controlling relay 120 which is operative during certain metering operations and which will not be described herein since it forms no part of the present invention. Normal post springs NPS352 prepare a point in the circuit for transmitting busy tone to the calling subscriber in case the marginal relay 320 is operated. Relay 320 is operated on seizure of the selector repeater only in case a restricted subscriber is calling. When a restricted subscriber calls, negative battery potential marking is connected to the positive lead 11 at the finder switch to increase the current flow through the center winding of relay 320 when the loop circuit previously traced for energizing relay 100 is completed. This battery potential is not connected to the positive finder lead when a non-restricted subscriber calls, with the result that relay 320 is not operated when a non-restricted subscriber seizes the selector repeater.

When the vertical wiper VW is raised to the tenth level in response to dialling the first digit 0, and when relay 300 restores, the following circuit is completed for operating relays 130 and 330 in case the relay 320 is not operated: ground through contacts 231, 303, the vertical wiper in engagement with its tenth vertical bank contact, back contacts 324, 318 and 118, and through the upper winding of relay 130 to battery, and through back contacts 330' and the winding of relay 330 to battery. Relay 330 locks itself over contacts 238 and 339. Relay 330, upon energizing, operates contacts 334 to open a point in the circuit for transmitting busy tone to the calling subscriber because a non-restricted subscriber is calling. In response to dialling a digit 0, the first selector in the main exchange is operated to connect the toll operator with the calling subscriber in order to establish a toll call.

Relay 320 is operated in response to seizure of the selector repeater on calls originated by a restricted subscriber, and contacts 321 prepare a locking circuit for itself which is completed as soon as relay 230 closes contacts 231. Relay 320, at contacts 324, prepares a circuit for relay 210; at contacts 322, prepares a point in the busy tone circuit; and at contacts 323, closes a circuit to the lower winding of relay 320 in series with the motor magnet in case the rotary lineswitch is off-normal. When the toll digit 0 is dialled, normal post springs NPS352 complete a circuit for transmitting busy tone to the calling subscriber when relay 130 restores. In this case, since relay 320 is operated, the circuit through the tenth vertical bank contact is not completed for relays 130 and 330 and the circuit for transmitting the busy tone to the calling subscriber may be traced as follows: busy tone source, normal post springs NPS352, contacts 322 of relay 320, contacts 334 and 132, and through the lower winding of relay 100 to ground. The busy tone is induced into the upper two windings of line relay 100 and transmitted over the incoming talking conductors 10 and 11 to the calling subscriber. The restricted subscriber is thereby given the busy signal to inform him that he is denied toll calls.

*All main exchange trunks busy*

In case all main exchange trunks are busy, the main exchange rotary switch MX continues to hunt as previously described until the twenty-fifth bank contact is reached, at which time a circuit is completed for holding relay 140 operated and a circuit is completed for operating test relay 200. The circuit for operating relay 140 in series with relay 200 may be traced as follows: from ground through contacts 365, 354, 233, 213, lower winding of relay 200, contacts 222 and 332, wiper 363 in engagement with its twenty-fifth bank contact, contacts 333 and through the lower and upper windings of relay 140 to battery. At contacts 143, relay 140 opens a circuit to the motor magnet MM to hold the rotary switch MX in its twenty-fifth position; and at contacts 144, relay 140 prepares a circuit for transmitting a busy tone to the calling subscriber, but such circuit is opened at back contacts 132 of relay 130. At contacts 203, relay 200 completes a circuit for operating switching relay 150 as follows: from ground through contacts 238, 216, 223, 203, 338, winding of relay 150 and through the winding of motor magnet MM to battery. At contacts 153, relay 150 completes a holding circuit for relay 140 as follows: from ground through contacts 365, 354, 233, 153, wiper 363 and its twenty-fifth bank contact, contact 333 and the windings of relay 140 to battery. Contacts 153 also close a short circuit for test relay 200 as follows: from contacts 153, through contacts 213, winding of relay 200, contacts 222 and 332, and back to contacts 153. At contacts 154, relay 150 connects dial tone as previously described; and at contacts 156, relay 150 prepares its own locking circuit. Relay 200 restores shortly after it is short circuited and at contacts 204, closes the locking circuit for relay 150 as follows: ground through contacts 238, 216, 223, 204, 205 and 156, and through the windings of relay 150 and motor magnet MM to battery.

In case the first digit dialled is a digit such as digits 1, 2, 3, 5, 6, 7 or 9, which indicates that the call is to be extended through the main exchange, then no circuit is completed through the upper winding of relay 130 to hold this relay operated after relays 300 and 240 restore. Also no circuit is completed for relay 330, and under these conditions relay 130 restores when relays 300 and 240 restore after the first digit. Relay 130, at contacts 132, connects the busy tone circuit to inform the calling subscriber that all main exchange trunks are busy. This busy tone circuit may be traced as follows: from busy tone source, through contacts 144, 334 and 132, and through the lower winding of relay 100 to ground. The busy tone is induced into the other windings of line relay 100 and transmitted to the calling subscriber over conductors 10 and 11.

In case the first dialled digit is 4 or 0 then relay 330 is operated and relay 130 is held over its upper winding as previously described. Relay 330, at contacts 333, opens the holding circuit to relay 140; and the latter relay, at contacts 143, closes the circuit for the rotary magnet RM and at contacts 144, opens a point in the busy tone circuit. In this case, since the relay 130 does not restore, the busy tone circuit is not completed at contacts 132 and the calling subscriber then dials the remaining digits to complete the connection over the selector repeater wipers as previously described.

In case the first digit dialled is 8, it will be remembered that relay 310 and the release magnet RLS were operated to restore the wipers of the selector repeater to normal; and that relay 130 was reoperated again when the switch reached normal position, over the vertical wiper VW, with the result that contacts 132 open the busy tone circuit.

In case the second dialled digit is 1, 2, 3, 7, 8 or 9, the relay 130 is held operated and relay 330 is operated. Relay 330 opens the holding circuit to relay 140 to cause the latter relay to release, thereby enabling the call to be completed as previously described without transmitting the busy tone. In case the second dialled digit is 4 or 0, which indicates that the call is to be extended through the main exchange, then no circuit is completed for relays 130 or 330. In this case relay 140 is held operated since relay 330 did not operate, and relay 130 restores shortly after dialling the second digit to complete the busy tone circuit at contacts 132 and 144. From the foregoing description it will be seen that the busy tone is not transmitted to the calling subscriber until enough digits have been dialled to designate that the call is to be completed through the main exchange.

It will now be assumed that subscriber A in the first branch exchange S1 calls subscriber B in the second branch exchange S2 at a time when the trunks connecting the branch exchange S1 to the main exchange M and the trunks connecting the branch exchange S1 to the branch exchange S2 are all busy. It will be remembered that when all the branch to main exchange trunks were found busy, the rotary switch MX stepped to its twenty-fifth position and relay 200 operated in series with relay 140, that relay 200 operated relay 150, and that relay 150 shorted relay 200 which released to lock relay 150 operated so that a call could be completed over the wipers of the selector repeater SR. When the selector repeater is operated by the second dialled digit 8, relay 140 restores when relay 330 operated contacts 333 to thereafter enable relay 140 to operate as an interrupter relay as previously described. In case the selector repeater finds all the trunks between the first branch exchange S1 and the second branch exchange S2 busy, the wipers of the selector repeater are rotated to their eleventh position where the cam spring 205, 219 and 351 are operated. Relay 200 is reoperated over the eleventh bank contact 389 and resistance R9 as previously described. At contacts 203 relay 200 completes a circuit for operating relay 250 as follows: ground, contacts 238, 216, 223, 203, 338, relay 250, and winding of rotary magnet RM to battery. Due to the high resistance of relay 250 magnet RM does not operate in the above traced circuit. At contacts 256 relay 250 completes a locking circuit for itself including resistance R6 and contacts 223, 216 and 238. Cam springs 205 complete a locking circuit for relay 150 by way of contacts 238 and 156 to maintain relay 150 operated. Cam springs 351 complete a circuit for reoperating relay 140 as follows: ground back contacts 365, contacts 354 of the busy key, make contacts 233, 153, wiper 363 and its twenty-fifth bank contact, cam 351, and through both windings of relay 140 to battery. Relay 140 at contacts 143 opens the circuit to the rotary magnet RM and at contacts 144 completes a circuit for transmitting the busy tone to the calling subscriber. This circuit may be traced from Busy Tone, contacts 144, contacts 254, through the lower winding of relay 100 to ground; the lower winding inducing a tone in the other windings of relay 100 which is connected to conductors 10 and 11, and the calling subscriber's line. From the foregoing it will be seen that the busy tone is not connected until after the selector repeater wipers have found all the trunks connecting the two branch exchanges busy, even though the trunks to the main exchange were all busy before the selector repeater was operated.

*Release*

The calling subscriber, upon replacing his receiver, opens the loop circuit to line relay 100; and the latter relay, at contacts 101, opens the circuit to slow to release relay 110. After an interval, relay 110 restores to connect the metering relay 120 to the positive lead for metering purposes; and at contacts 116, opens the circuit to relay 230. Relay 230 restores, and contacts 231 open the locking circuit to relay 320 if operated. Contacts 233 disconnect the busy holding ground from wiper 363, or from wiper 346 if relay 210 is operated, or from wiper 343 if relay 250 is operated, to release the switches accessible to these wipers in the well-known manner. At contacts 234, relay 230 completes the circuit for the release magnet RLS to release the switching selector repeater; at contacts 235, opens a point in the metering circuit and prepares a point in the circuit for connecting idle battery potential to the C lead 12; and at contacts 236 and 237, completes a circuit for the lower winding of relay 320 in series with resistance R4. At contacts 238, relay 230 opens the locking circuits of relays 330, 210, 250, 310 and 150 to cause their restoration. The circuit for operating relay 320 may be traced as follows: from ground through wiper 364 in engagement with its multipled bank contacts, the lower winding of relay 320, back contacts 237, 218 and 236, and through the resistance R4 to battery. At contacts 323, relay 320 completes the following circuit for operating motor magnet MM of switch MX: from ground through wiper 364 in engagement with its multipled bank contacts, lower winding of relay 320, back contacts 237 and 218, contacts 323, 255, 143, 335, 155 and through the winding of motor magnet MM to battery. Motor magnet MM operates over the above traced circuit to step the wipers of the switch MX one step; and at contacts 365, the motor magnet completes a circuit through the upper winding of interrupter relay 140 to battery. Relay 140, at contacts 143, opens the circuit to motor magnet MM. Motor magnet MM restores and opens the circuit to relay 140 at contacts 365. This interaction between motor magnet MM and relay 140 continues until wiper 364 steps off of its multipled bank contacts, at which time the circuit to relay 320 is opened. Relay 320 restores and, at contacts 323, opens the circuit to motor magnet MM to prevent its reoperation, thereby maintaining the switch MX in its normal position.

When relay 230 closes its back contacts 234, release magnet RLS is operated by way of vertical off-normal contacts 217 to cause the wipers of the selector repeater to be restored to normal in the well known manner. When the wipers of the switch are restored to normal, vertical off-normal springs 217 open the circuit of release magnet RLS; vertical off-normal contact 239 connects battery potential through resistance R4, contacts 236, 218, 336 and 235 to the conductor 12 to apply idle potential thereto; and vertical off-normal contacts 353 prepare a point for connecting dial tone to the line relay 100. All the apparatus is now restored to normal and may be used on subsequent calls.

What is claimed is:

1. In a telephone system, a main exchange, a first branch exchange, a second branch exchange, a first group of main exchange trunks interconnecting said first branch exchange and said main exchange, a second group of main exchange trunks interconnecting said second branch exchange and said main exchange, a group of branch exchange trunks interconnecting said first and second branch exchanges, means including a switching selector repeater in said first branch exchange for establishing a connection between a calling subscriber in said first branch exchange and a called subscriber in the same exchange, connecting means in said switching selector repeater having access to said group of branch exchange trunks, a rotary switch permanently associated with said switching selector repeater and having access to said first group of main exchange trunks, means for operating said rotary switch to select an idle one of said first group main exchange trunks whenever said switching selector repeater is taken into use by a calling subscriber; automatic switches in the main exchange controlled over said selector repeater, said rotary switch and said selected first group main exchange trunk by said calling subscriber to select an idle one of said second group main exchange trunks; means in said switching selector repeater for operating said connecting means, simultaneously with the operation of said automatic switches, to connect with an idle one of said branch exchange trunks; switching means in said switching selector repeater operated in the event that said connecting means connects with an idle branch exchange trunk for freeing said first group main exchange trunk, for releasing said automatic switches and for connecting said calling line to said connected branch exchange trunk to thereby enable said calling subscriber to complete a connection over said branch exchange trunk to a called subscriber in said second branch exchange; and means in said switching selector repeater effective in the event said branch exchange trunks are busy for maintaining said calling line connected to said first and second main exchange trunks and said automatic switches to thereby enable said calling line to complete a connection thereover to the called subscriber in said second branch exchange.

2. In a telephone system, a main exchange, a first branch exchange, a second branch exchange, a first group of main exchange trunks interconnecting said first branch exchange and said main exchange, a second group of main exchange trunks interconnecting said second branch exchange and said main exchange, a group of branch exchange trunks interconnecting said first and second branch exchanges, a switching selector repeater in said first branch exchange, wipers in said switching selector repeater having access to said group of branch exchange trunks, a rotary switch permanently associated with said switching selector repeater and having access to said first group of main exchange trunks, means for operating said rotary switch to select an idle one of said first group main exchange trunks whenever said switching selector repeater is taken into use by a calling subscriber, automatic switches in the main exchange accessible to said rotary switch, means in said switching selector repeater for operating said wipers to connect with an idle one of said branch exchange trunks and for simultaneously operating said automatic switches over said rotary switch to select an idle one of said second group main exchange trunks; switching means in said switching selector repeater operated in the event that said wipers connect with an idle branch exchange trunk for freeing said first group main exchange trunk, for releasing said automatic switches and for connecting the calling subscriber's line to said connected branch exchange trunk to enable said line to complete a connection over said branch exchange trunk to a called subscriber in said second branch exchange; and means in said switching selector repeater effective in the event said branch exchange trunks are busy for maintaining said line connected to said first and second main exchange trunks and said automatic switches to enable said calling subscriber to complete a connection thereover to the called subscriber in said second branch exchange.

3. In a telephone system, a main exchange, a first sub-exchange, a second sub-exchange, trunk lines connecting each said exchange with each of the other exchanges, automatic switches in the main exchange controlled over a trunk line interconnecting said main exchange and said first sub-exchange by a calling subscriber in said first sub-exchange to select a trunk line interconnecting the main exchange and said second sub-exchange, a selector repeater in said first sub-exchange having access to the trunk lines interconnecting said first and second sub-exchanges, means in said selector repeater controlled over a calling line for operating said selector repeater to hunt for an idle trunk interconnecting said first and second sub-exchanges simultaneously with the operation of said automatic switches, switching means in said selector repeater operated in the event said selector repeater finds and connects with an idle trunk interconnecting said first and second sub-exchanges for releasing said automatic switches in the main exchange and for maintaining the calling line connected to said last mentioned trunk interconnecting said first and second sub-exchanges to enable the completion of a connection thereover to a called line in said second sub-exchange; and said switching means remaining unoperated in the event said trunks interconnecting said first and second branch exchanges are found busy to thereby maintain said calling line connected to said selected trunk line interconnecting said main exchange and said second sub-exchange to enable the completion of a connection from said calling line over the trunk line interconnecting said first sub-exchange and said main exchange, said automatic switches, and said selected trunk line interconnecting said main exchange and said second sub-exchange to a called line in said second sub-exchange.

4. In a telephone system, a main exchange, a first sub-exchange, a second sub-exchange, trunk lines connecting each said exchange with each of the other exchanges, an automatic switch in the main exchange connected to each trunk line interconnecting said main exchange and said first sub-exchange, a selector repeater in said first sub-exchange having access to the trunk lines interconnecting said first and second sub-exchanges and to said trunk lines interconnecting said first sub-exchange and said main exchange, means in said selector repeater for simultaneously operating said selector repeater and one of said automatic switches in said main exchange, switching means in said selector repeater operated in the event said selector repeater finds and connects with an idle trunk interconnecting said first and second sub-exchanges for releasing said one automatic switch in said main exchange, said switching means remaining unoperated in the event said trunks interconnecting said first and second sub-exchanges are busy to maintain said calling line connected to said one automatic switch; and means for thereupon completing a connection from said calling line over said maintained connection, said one automatic switch, and over a trunk interconnecting said main exchange and said second sub-exchange.

5. In a telephone system, a main exchange, two branch exchanges, trunk lines connecting each exchange with each of the other exchanges, automatic switches in the main exchange controlled by a calling subscriber in the first branch exchange to select a trunk line extending from the main exchange to the second branch exchange, a switching selector repeater in said first branch exchange operated simultaneously with the operation of said automatic switches, means including wipers in said selector repeater controlled by the said operation of said selector repeater for selecting a trunk extending from said first branch exchange to said second branch exchange and for releasing said automatic switches in case one of said trunks connecting said first and second branch exchanges is idle, and means in said selector repeater effective, in case all said trunks connecting said first and second branch exchanges are busy, for maintaining, instead of releasing, said automatic switches and for further extending said connection by way of said automatic switches and said selected trunk line connecting said main and said second branch exchange.

6. In a telephone system, a main exchange, two branch exchanges, trunk lines connecting each exchange with each of the other exchanges, automatic switches in the main exchange controlled by a calling subscriber in the first branch exchange to select a trunk line extending from the main exchange to the second branch exchange, a switching selector repeater in the first branch exchange operated simultaneously with the operation of said automatic switches, means including wipers in said selector repeater controlled by said operation of said selector repeater for selecting a trunk extending from the first branch exchange to said second branch exchange in case one of said trunks connecting said first and second branch exchanges is idle, and means in said selector repeater effective, in case said wipers find all said trunks connecting said first and second branch exchanges busy, for further extending said connection by way of said automatic switches and said selected trunk line connecting said main exchange to said second branch exchange.

7. In a switching selector repeater for use in branch exchanges, said selector repeater adapted when seized by a calling branch exchange subscriber to extend a connection over a first trunk line connecting said calling branch exchange to a main exchange, wipers positioned by vertical and rotary movements of the selector repeater for also extending a connection over a second trunk line connecting the calling branch exchange to a second branch exchange, switching means for releasing said main exchange connection and for rendering the selector repeater effective to extend a connection by way of said wipers when sufficient digits have been dialled to identify said call as a call to said second branch exchange, a vertical wiper positioned by the vertical movement of said selector repeater for controlling said switching means, and disabling means effective in case said second trunk line is busy for disabling said switching means to prevent the release of said main exchange connection and for enabling the extension of said call over said main exchange connection and a third trunk line connecting said main exchange to said second branch exchange.

8. In a telephone system, a main exchange, a first branch exchange, a second branch exchange, trunk lines interconnecting all said exchanges, automatic switches in the main exchange, a switching selector repeater in said first branch exchange accessible to a calling first branch exchange subscriber, said selector repeater adapted to repeat impulses over a first branch to main exchange trunk line to thereby operate a series of said main exchange automatic switches, means for simultaneously operating said selector repeater in its primary movement and the first of said series of automatic switches at the main exchange responsive to the first digit of the called number, means for releasing said selector repeater when such first digit designates a called subscriber line in either branch exchange, means for simultaneously operating the selector repeater in a second primary movement and the second series of automatic switches at the main exchange responsive to the second digit of said called number, said second series of automatic switches in the main exchange automatically operative to select an idle trunk from the main exchange to said second branch exchange in case said second digit designates a called second branch exchange subscriber's line, means for disabling said selector repeater from further operation in case said first or second digit designates a called main exchange subscriber's line, a vertical wiper positioned by said primary movements of said selector repeater for controlling said releasing and disabling means, means for operating said selector repeater in its secondary movement after said second digit to select an idle trunk connecting said first and second branch exchanges in case said second digit designates a called second branch exchange subscriber's line, means for releasing said first branch to main exchange trunk and said main exchange automatic switches in response to said selector repeater selecting and seizing said idle trunk connecting said first and second branch exchanges, means for disabling said last mentioned releasing means to prevent the release of said first branch to main exchange trunk and said main exchange automatic switches in case all said trunk lines interconnecting said first and second branch exchanges are busy, and means for thereafter completing said call to a called second branch exchange subscriber's line by way of said main exchange automatic switches and said main to second branch exchange trunk line.

9. In a telephone system, a main exchange, a first branch exchange, a second branch exchange, trunk lines interconnecting all said exchanges, a switching selector repeater in said first branch exchange adapted to respond to one or more digits of a called number simultaneously with automatic switches in said main exchange, a control circuit including a source of current in said first branch exchange for controlling said main exchange automatic switches, means for automatically operating said main exchange automatic switches to select and seize an idle one of said trunk lines interconnecting said main and second branch exchanges in case the dialled digits designate a call to said second branch exchange, testing means in said selector repeater operative for selecting and seizing an idle one of said trunk lines interconnecting said first and second branch exchanges when sufficient digits have been dialled to designate a call to said second branch exchange, means for transferring said control circuit to an automatic switch in said second branch exchange in response to said seizure of said one first to second exchange trunk line, means in said selector repeater for releasing the connection to said main exchange and said main exchange automatic switches in response to said transfer of said control circuit, said testing means remaining inoperative in case all of said trunk lines interconnecting said first and second branch exchanges are busy to prevent said transfer of said control circuit and the release of said main exchange connection and said main exchange automatic switches, and means for thereafter completing said call to said called second branch exchange subscriber's line over said main exchange automatic switches and said one trunk line interconnecting said main and second branch exchanges.

10. In a telephone system, a line, a switching selector repeater having two sets of wipers and a rotary switch individual thereto, a first group of automatic switches accessible to said wipers and a second group of automatic switches accessible to said rotary switch, means for connecting said line to said selector repeater, means responsive to said connection for operating said rotary switch to connect with one of said second group automatic switches, pulsing means in said selector repeater controlled from said line for simultaneously operating said connected second group automatic switch and the wipers of said selector repeater in a first setting operation, means for automatically releasing said wipers of the selector repeater after said first setting operation, said pulsing means again controlled from said line for reoperating said wipers in a second setting operation and for simultaneously operating a second of said second group switches by way of said first connected second group switch, means responsive to said second setting of said wipers for determining whether said wipers and said first group automatic switches or said rotary switch and said second group automatic switches are to be used for extending the connection from said line, means in said selector repeater for rotating said wipers after said second setting operation in case the call is to be extended by way of said wipers, testing means in said selector repeater operative during the rotary movement of said wipers for determining which set of wipers is to be used to extend the connection, said testing means being inoperative to extend a connection over either set of wipers, in case said first group automatic switches are all busy, and operative to enable the connection from the calling line to be completed by way of said operated second group automatic switches.

11. In a telephone system, a selector repeater having access to a first group of trunk lines, a rotary switch permanently associated with said selector repeater and having access to a second group of trunk lines, a rotary magnet for operating said selector repeater to select an idle one of said first group trunk lines, a motor magnet for operating said rotary switch to select an idle one of said second group trunk lines, means for seizing said selector repeater, a circuit for operating said motor magnet completed in response to said seizure, an interrupter relay in said selector repeater, means for operating said interrupter relay in response to each operation of said motor magnet, contacts on said interrupter relay for interrupting said motor magnet circuit each time said interrupter relay operates, a test relay in said selector repeater, means for operating said test relay in response to said rotary switch selecting an idle one of said second group trunk lines, a first switching relay operated in response to said operation of said test relay, means for restoring said test relay in response to the operation of said first switching relay, a control relay in said selector repeater, means for operating said control relay, a circuit for operating said rotary magnet completed by the operation of said control relay, other means for operating said interrupter relay in response to each operation of said rotary magnet, said contacts on said interrupter relay interrupting said rotary magnet circuit each time said interrupter relay operates, additional means for operating said test relay a second time in response to said selector repeater selecting an idle one of said first group trunk lines, a second switching relay operated in response to said second operation of said test relay, and means for restoring said first switching relay in response to said second operation of said test relay.

12. In a telephone system as claimed in claim 11 wherein said means for restoring said test relay comprises a short circuit around said test relay completed by the operation of said first switching relay and which short circuit is opened in response to the operation of said control relay to enable said second operation of said test relay.

13. In a telephone system as claimed in claim 11 wherein said selector repeater includes cam springs which are operated in case said selector repeater fails to select an idle one of said first group trunk lines, and a locking circuit for maintaining said first switching relay operated in response to the operation of said cam springs.

14. In a telephone system, a selector repeater having access to a first group of trunk lines, a rotary switch permanently associated with said selector repeater and having access to a second group of trunk lines, means for seizing said selector repeater, means for operating said rotary switch in response to said seizure to cause said rotary switch to select an idle one of said second group trunk lines, a test relay in said selector repeater operated in response to said rotary switch selecting an idle one of said second group trunk lines, a first switching relay in said selector repeater operated in response to said test relay operation, means for restoring said test relay in response to the operation of said first switching relay, means for operating said selector repeater to cause said selector repeater to select an idle one of said first group trunk lines, other means for operating said test relay a second time in response to said selector repeater selecting an idle one of said first group trunk lines, a second switching relay in said selector repeater operated in response to the second operation of said test relay, and means for restoring said first switching relay in response to said second operation of said test relay.

15. In a telephone system as claimed in claim 14 wherein said means for restoring said test relay includes a short circuit around said test relay completed by the operation of said first switching relay and wherein said means for operating said selector repeater opens said short circuit to enable said second operation of said test relay.

16. In a telephone system as claimed in claim 14 wherein said other means remains inoperative in case said selector repeater fails to select an idle one of said first group trunk lines to prevent the reoperation of said test relay, to prevent the operation of said second switching relay and to maintain said first switching relay operated.

17. In a telephone system, a selector repeater having access to a first group of trunk lines, a rotary switch permanently associated with said selector repeater, said switch having a normal position, a second group of trunk lines accessible to said switch, means for seizing said selector repeater in response to the initiation of a call by a calling subscriber, means including an interrupter relay in said selector repeater for operating said switch from its normal position in response to said seizure to cause said switch to select an idle one of said second group trunk lines, means including said interrupter relay for operating said selector repeater to cause said selector repeater to select an idle one of said first group trunk lines, means for completing said call over either one of said selected trunk lines to a called subscriber's line, means for releasing said selector repeater and said completed call in response to the calling subscriber replacing his receiver, and means in said selector repeater including said interrupter relay for operating said switch to its normal position in response to the calling subscriber replacing his receiver.

18. In a telephone system, a selector repeater having access to a first group of trunk lines, a rotary switch permanently associated with said selector repeater, said switch having a normal position and an all trunk busy position, a second group of trunks accessible to said switch, means for seizing said selector repeater in response to the initiation of a call by a calling subscriber, means including an interrupter relay in said selector repeater for operating said switch from its normal position in response to said seizure to cause said switch to seize an idle one of said second group trunk lines in case one of such trunk lines is idle or to cause said switch to stop at said all trunk busy position in case all said second group trunks are busy, means for operating said interrupter relay in response to said switch stopping in said all trunk busy position, control means operative for restoring said interrupter relay and for operating said selector repeater and said interrupter relay to cause said selector repeater to seize an idle one of said first group trunk lines when sufficient digits have been dialled to identify said call as a call to be completed over said first group of trunk lines, said control means remaining inoperative when sufficient digits have been dialled to identify said call as a call to be completed over said second group of trunk lines to prevent the restoration of said interrupter relay, a busy tone source, and means including contacts closed by said interrupter relay for transmitting a busy tone from said source to the calling subscriber after sufficient digits have been dialled to identify said call as a call to be completed over said second group trunk lines.

19. In a telephone system, a plurality of exchanges, trunk lines connecting each exchange with each of the other exchanges, automatic switches in each exchange, a switching selector repeater in one exchange having wipers, means in said one exchange for seizing said switching selector repeater and for automatically causing said switching selector repeater to seize a trunk line to another exchange, means for operating said switching selector repeater and for simultaneously operating a switch in said other exchange over the seized trunk line, means for causing the wipers of the switching selector repeater to test the trunk lines leading to a third exchange after operation thereof, means for releasing the operated switch in said other exchange if a trunk line leading to the third exchange is found idle, means in the switching selector repeater for maintaining the switching selector repeater in operated position and for maintaining the connection to the automatic switch in said other exchange if all the trunks to said third exchange are found busy, and for thereafter completing a connection through said switches to a line in said third exchange.

References Cited in the file of this patent

UNITED STATES PATENTS

| | | |
|---|---|---|
| 1,537,306 | Jacobsen | May 12, 1925 |
| 1,645,549 | Smith | Oct. 18, 1927 |
| 1,675,310 | Saville | June 26, 1928 |